United States Patent [19]

Landry et al.

[11] Patent Number: 4,736,903
[45] Date of Patent: Apr. 12, 1988

[54] SELF-LOCKING HUB ASSEMBLY FOR A COMPACT AUDIO TAPE CASSETTE AND METHOD FOR ASSEMBLY

[75] Inventors: Vincent Landry, Saco; John Gelardi, Cape Porpoise, both of Me.

[73] Assignee: Shape Inc., Biddeford, Me.

[21] Appl. No.: 858

[22] Filed: Jan. 6, 1987

[51] Int. Cl.⁴ .................................. G11B 23/04
[52] U.S. Cl. ........................................ 242/198
[58] Field of Search ............... 242/198, 199, 200, 201

[56] References Cited

U.S. PATENT DOCUMENTS

| 3,066,880 | 12/1962 | Bauer | 242/55.13 |
| 3,104,843 | 9/1963 | Missriegler et al. | 242/55.13 |
| 3,105,645 | 10/1963 | Rost | 242/55.13 |
| 3,245,629 | 4/1966 | Rost | 242/55.13 |
| 3,401,899 | 9/1968 | Goldberg | 242/55.13 |
| 3,801,042 | 4/1974 | Dobson | 242/199 |
| 4,033,523 | 7/1977 | Roman | 242/198 |
| 4,515,331 | 5/1985 | Stümpfi et al. | 242/199 |
| 4,541,587 | 9/1985 | Stümpfi et al. | 242/197 |
| 4,585,187 | 4/1986 | Okamura et al. | 242/198 |

FOREIGN PATENT DOCUMENTS

| 1076103 | 7/1975 | Fed. Rep. of Germany . | |
| 199480 | 11/1983 | Japan | 242/199 |
| 2089765 | 6/1982 | United Kingdom | 242/199 |

Primary Examiner—Stuart S. Levy
Assistant Examiner—Joseph J. Hail, III
Attorney, Agent, or Firm—Staas & Halsey

[57] ABSTRACT

An internal, self-locking hub assembly for a compact, audio, tape cassette is described, including a locking member with at least one movable portion and a spring. The cassette includes at least one receptacle formed in the raised annular rings thereof. The spring normally forces the movable portion radially inward in a direction parallel to the plane of the hub, wherein the movable portion engages the at least one receptacle in the raised annular ring, and locks the hub against rotation. On the other hand, when the tape cassette is placed into a tape player/recorder, the spindle thereof enters the center of the hub, abuts and moves the at least one movable portion radially outward against the force of the spring, thereby unlocking the at least one movable portion from the at least one receptacle and permitting normal rotation of the hub. A related method includes the steps of: forming the locking member to include at least one movable portion, a spring and a locating member; picking up the locking member; forming a hub to include a mounting member corresponding to the locating member; advancing the locking member to the hub; inserting the locking member into the hub such that the locating member is fixedly received by the mounting member; mounting the hub into a cassette base; forming a cassette cover to include the at least one receptacle; and positioning the cassette cover on the base, such that the at least one receptacle receives the at least one movable portion.

8 Claims, 6 Drawing Sheets

SELF-LOCKING HUB ASSEMBLY FOR A COMPACT AUDIO TAPE CASSETTE AND METHOD FOR ASSEMBLY

BACKGROUND OF THE INVENTION

This invention relates to a compact, audio, tape cassette and, more particularly, to a self-locking hub assembly for such a tape cassette which prevents despooling of the recording tape when the tape cassette is not engaged with a tape player/recorder.

A conventional, compact, audio, tape cassette contains two hubs onto which the tape is wound for supply and take-up during operation. These hubs are located between the tape cassette cover and base and are contained radially by pairs of raised annular rings formed on the inside surfaces of the cover and base which engage recessed rings on the top and bottom surfaces of each hub. When engaged with a tape player/recorder, a finned spindle thereof enters the center of the hub and cooperates with spokes formed on the center of the hub to permit a driven clockwise or counterclockwise motion of the hubs.

Because of industry tolerances, the spindles of one manufacturer's tape player/recorder can be as much as 1/32 inch different in relative location (closer or further apart) than those of another manufacturer. It is, therefore, necessary to create a clearance between the recessed rings formed on the hubs and the raised annular rings formed on the tape cassette cover and base. This clearance, however, means that, when a tape cassette is disengaged from the tape player/recorder, the hubs can turn freely and "despool," i.e., allow tape to spill throughout the inside of the tape cassette. Such despooling is not desirable because tape damage and jam conditions can result.

In order to prevent despooling, manufacturers of compact, audio, tape cassettes, an example of which is shown in FIG. 1 herein and referred to generally by reference numeral 10, currently use a separate, elongated clip 12 having perpendicular hooks 14 and 16 at the ends thereof which are manually inserted into the centers 18 and 20 of the tape reel hubs 22 and 24, respectively. The clip 12 is relatively simple, inexpensive and requires little work to apply after the tape cassette 10 is assembled. As a result, such clips 12 have gained widespread acceptance in the compact, audio, tape cassette industry. Unfortunately, however, the consumer ultimately removes the clip 12 to use the tape cassette 10 and usually discards the clip 12, which again results in despooling during subsequent handling.

In arts other than the compact, audio, tape cassette art, efforts have also been made to prevent despooling. For example, U.S. Pat. No. 3,066,880, issued to BAUER, describes a self-locking hub assembly for a single reel tape cartridge, which is shown in FIGS. 2 and 3 herein. More particularly, an axially and radially extending slot 30 is formed in the hub 32 to receive a movable member 34 for releasably coupling the hub 32 to the cartridge 36. The movable member 34 is pivotally mounted on a pin 38 extending across the slot 30 for angular movement relative to the plane of the hub 32. The movable member 34 includes a detent portion 40 which is normally urged by a spring 42 upwards toward the cartridge portion 44 to be received in any one of a plurality of radially extending slots 46 formed in the inside wall of the cartridge portion 44. The movable member 34 also has an actuator portion 48 which can extend inwardly from the inside wall 50 of the hub 32. Upon engaging the cartridge 36 with a tape player/recorder (not shown), the spindle 52 thereof causes the movable member 34 to rotate, which moves the actuator portion 48 outwardly and releases the hub 34 from the cartridge 36 so that the tape (not shown) can be supplied and taken up under the control of the spindle 52.

The self-locking hub assembly described in the '880 patent provides suitable self-locking for a single reel tape cartridge, but is not applicable to a double reel, compact, audio, tape cassette. As evidence, although the teaching of the '880 patent has been available for almost twenty-five years and compact, audio, tape cassettes have been available at least for twenty years (see U.S. Pat. No. 3,394,899, issued to SCHOENMAKERS), no one has successfully incorporated the type of self-locking hub assembly taught by the '880 patent into a compact, audio, tape cassette—the reasons follow.

First, the pivoting nature of the self-locking hub assembly of the '880 patent works only when the single reel tape cartridge is inserted into the tape player/recorder in the one direction shown in FIG. 3 herein. If an attempt is made to insert the single reel tape cartridge 36 in the opposite direction, the movable member 34 would immovably abut the spindle 52 and prevent insertion of the cartridge 36 into the tape player/recorder. Compact, audio, tape cassettes, on the other hand, are intentionally reversible, i.e., are designed to be inserted into the tape player/recorder from two distinct directions, the top first or bottom first, to play both "sides" or "tracks" of the tape. As a result, if the self-locking hub assembly of the '880 patent was used in a compact, audio, tape cassette, it might be capable of locking the hub when the cassette was not engaged with the tape player/recorder; however, unlocking of the hub and operation of the tape cassette would be impossible when inserted in a second direction.

Second, the self-locking hub described in the '880 patent requires enough vertical space in the cartridge to incorporate at least one opening 46, the movable member 34, the pivot pin 38 and the spring 42. In addition, the movable member 34 must have enough room to pivot up and down in order to operate. In a compact, audio, tape cassette, space is very limited. For example, a self-locking hub assembly would have to occupy only about 155 to 165 thousandths of an inch. As a result, a compact, audio, tape cassette could not incorporate the several members or the pivoting, angular motion required by the self-locking hub assembly of the '880 patent. Further, in light of the limited ability to insert the device of the '880 patent in only one direction, if one were to attempt to make the movable member 34 pivot in opposite directions to allow insertion of the cassette top first or bottom first, more components and more space would be required, which a compact, audio, tape cassette could not accommodate.

Third, relatively complicated assembly of the pivoting device of the self-locking hub of the '880 patent in a compact, audio, tape cassette is prohibited by the mere nature of compact, audio, tape cassette manufacturing, wherein speedy, simple and low cost, mass production are critical.

In light of the above, a more efficient and easier to assemble self-locking hub assembly for a compact, audio, tape cassette is desired, which prevents the hubs from rotating whenever the cassette is not engaged with a tape player/recorder, but allows easy release of the hubs, when the cassette is inserted in either direction into a tape player/recorder. A faster and easier method for assembling a self-locking hub assembly is also desired.

SUMMARY OF THE INVENTION

Accordingly, it is an object of the present invention to provide a self-locking hub assembly for a compact, audio, tape cassette capable of cost efficient manufacture and assembly, and reliable operation.

It is another object of the present invention to provide a self-locking hub assembly for a compact, audio, tape cassette capable of operational movement only parallel to the plane of the hub to minimize space requirements and allow insertion of the cassette into the tape player/recorder in more than one direction.

It is another object of the present invention to provide a self-locking hub assembly for a compact, audio, tape cassette capable of easily locking the hubs against rotation when the tape cassette is disengaged from a tape player/recorder and easily unlocking the hubs when inserted into the tape player/recorder in either of two directions.

It is another object of the present invention to provide a self-locking hub assembly for a compact, audio, tape cassette which efficiently fits fully within the interior of the tape cassette without undesirably interfering with the normal operation thereof.

It is another object of the present invention to provide a compact, audio, tape cassette with a self-locking hub assembly capable of automatic operation unassisted by the user of the tape cassette.

Finally, it is an object of the present invention to provide a method of assembling a self-locking hub assembly for a compact, audio, tape cassette characterized by greater speed and accuracy, facilitated automation and less cost than the prior art methods.

To achieve the foregoing and other objects of the present invention and in accordance with the purposes of the invention, there is provided an internal, self-locking hub assembly for a compact, audio, tape cassette, including a locking member with at least one movable portion and spring means. The tape cassette includes receiving means formed in a raised annular ring thereof. When the tape cassette is disengaged from a tape player/recorder, the spring means normally urges the at least one movable portion radially inward parallel to the plane of the hub, whereby the at least one movable portion engages the receiving means, locking the hub and the tape against rotation. On the other hand, when the tape cassette is engaged with a tape player/recorder from either of two directions, the spindle of the tape player/recorder enters the center of the hub, abuts and pushes the at least one movable portion against the force of the spring means, thereby removing the at least one movable portion from the receiving means and permitting normal rotation of the hub.

The related method includes the steps of: forming the locking member to include at least one movable portion, a spring means and a locating means; picking up the locking member; forming a hub to include mounting means corresponding to the locating means; advancing the locking member to the hub; inserting the locking member into the hub such that the locating means is received by the mounting means; mounting the hub into a cassette base; forming a cassette cover with receiving means; and positioning the cassette cover on the base, such that the receiving means receives the at least one movable portion.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
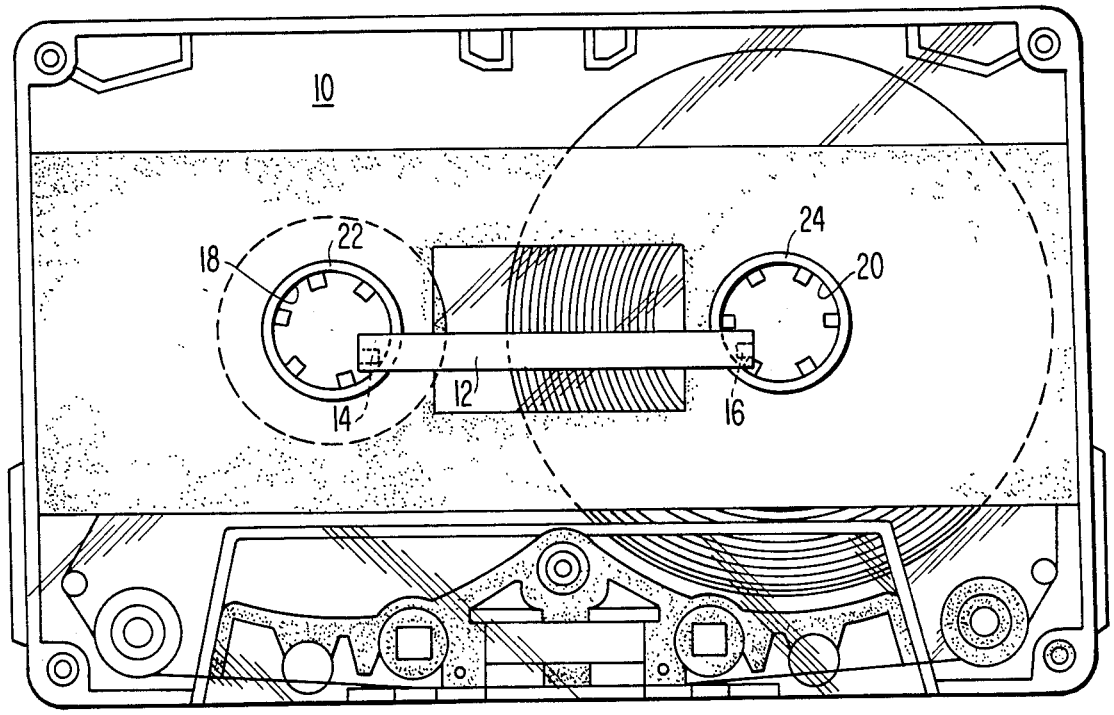
FIG. 1 is a top, planar view of a conventional compact, audio, tape cassette, illustrating particularly the use of an elongated clip having end hooks inserted into the hubs to prevent despooling.
Figure 2:
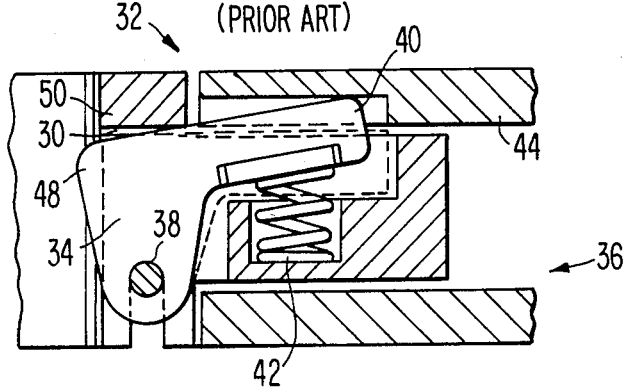
FIG. 2 is a side, cross-sectional view of a conventional self-locking hub assembly for a single reel tape cartridge, illustrating particularly the cartridge disengaged from a tape player/recorder.
Figure 3:
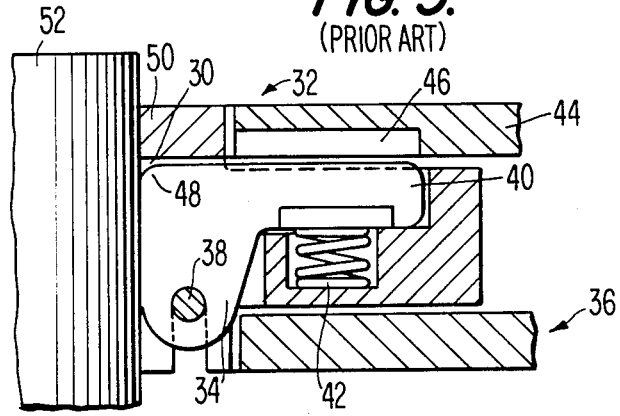
FIG. 3 is a side, cross-sectional view of the self-locking hub assembly shown in FIG. 2, illustrating particularly the single reel tape cartridge engaged with a tape player/recorder.

The preferred embodiments of the present invention will now be described with reference to FIGS. 4-18, wherein like reference numerals indicate like parts.

Figure 4:
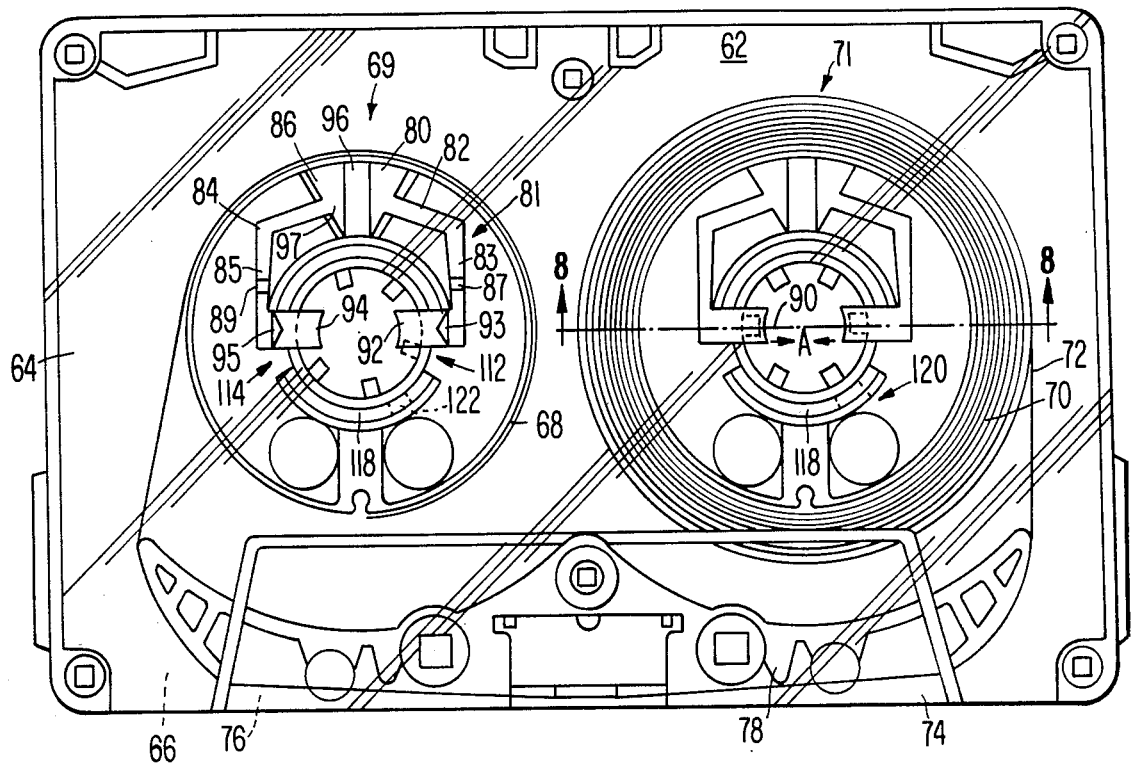
FIG. 4 is a top, plan view of the compact, audio, tape cassette according to the present invention, illustrating particularly the first embodiment of the self-locking hub assembly while the tape cassette is disengaged from a tape player/recorder.

FIGS. 4 through 8 illustrate the first embodiment according to the present invention. In this embodiment, a tape cassette 62 includes a cover 64 and a base 66, each of which are preferably made of a clear, hard plastic such as styrene. Positioned within the cover 64 and base 66 are a first tape reel hub 68 and a second tape reel hub 70 which supply and take up the tape 72 in the tape cassette 62. Each tape reel hub 68 and 70 is preferably made of a dark-colored plastic such as acetal. Although only a single hub is shown in FIGS. 5, 8–12, and 16–18, it is to be understood that the present invention contemplates a similar structure for each of the two hubs in a compact, audio, tape cassette such as shown in FIG. 4. Elevated areas 74 and 76 can be formed in the cover 64 and the base 66 of the tape cassette 62, respectively, for receiving a tape guide 78, such as described in co-assigned U.S. Pat. No. 4,506,846, now U.S. Reissue Ser. No. 823,481.

Associated with each first tape reel hub 68 is a first embodiment of a self-locking hub assembly 69. Associated with each second tape reel hub 70 is also a self-locking hub assembly 71 identical to the assembly 69. As a result, only the self-locking hub assembly 69 will be described hereafter in detail.

The self-locking hub assembly 69 includes a locking member 80, at least one portion of which is movable relative to the hub 68. More particularly, the locking member 80 includes spring means 81 in the form of two flat, angled spring arms 82 and 84 extending from a central, flat portion 86 of the locking member 80. Main portions 83 and 85 of the spring arms 82 and 84 are substantially parallel to each other. Each spring arm 82 and 84 preferably terminates in an abutting portion 92 and 94, extending perpendicular and coplanar to the main portions 83, 85, respectively. Operatively connected to each of the abutting portions 92, 94 is an upwardly projecting engaging portion 93 and 95, respectively. Each spring arm 82, 84 normally biases the respective and movable abutting portions 92, 94 and the operatively connected engaging portions 93, 95 radially inward as shown by arrow "A" in FIG. 4 relative to the center line 90 of the tape reel hub 68. Optionally, each spring arm 82 and 84 may also include an upright, reinforcing member 87, 89, each of which is intended to add rigidity to the spring arms 82 and 84 and to prevent upward bowing thereof.

In addition, the central portion 86 of the locking member 80 includes on the top surface 97 thereof a reinforcing member 96 and on the bottom surface 99 thereof locating means 98, such as a pair of parallel, rectangular ribs 100 and 102.

The hub 68 includes mounting means 104, such as a pair of parallel rectangular openings 106 and 108 (see FIG. 5) corresponding to the pair of rectangular ribs 100 and 102 of locating means 98. The hub 68 also includes an inner annular wall 110 having two opposing openings 112, 114 formed therein for receiving the abutting portions 92 and 94, respectively. The hub 68 also has an outer annular wall 116.

Raised annular rings 118 formed on the inside surface of the cover 64 of the tape cassette 62 include receiving means 120 therein, such as a plurality of radially spaced receptacles 122.

Operation of the first embodiment of the present invention will now be described, again with reference to FIGS. 4-8. Normally, the locking member 80 is kept in the "locked" position shown in FIG. 4. That is, the spring arms 82, 84 bias the operatively connected abutting portions 92, 94 and engaging portions 93, 95 inwardly such that the engaging portions 93, 95 are received by two oppositely disposed receptacles 122 in the raised annular ring 118 of the cover 64. As a result, the hub 68 is prevented from rotating and no "despooling" of the tape occurs. On the other hand, upon insertion of the tape cassette 62 into a tape player/recorder as suggested by FIG. 8, the finned spindle 124 of the tape player/recorder abuts and pushes on the movable abutting portions 92, 94, which causes the operatively connected and engaging portions 93, 95 to also move radially outward against the biasing force of the spring arms 82, 84. As the engaging portions 93, 95 move outwardly, they leave the receptacles 122, thereby releasing the hub 68 from the "locked" position and creating the "unlocked" position. In the unlocked position, the hubs 68, 70 are free to rotate on the raised annular rings 118 and transport tape while being driven by the spindle 124 of the tape player/recorder.

Figure 5:
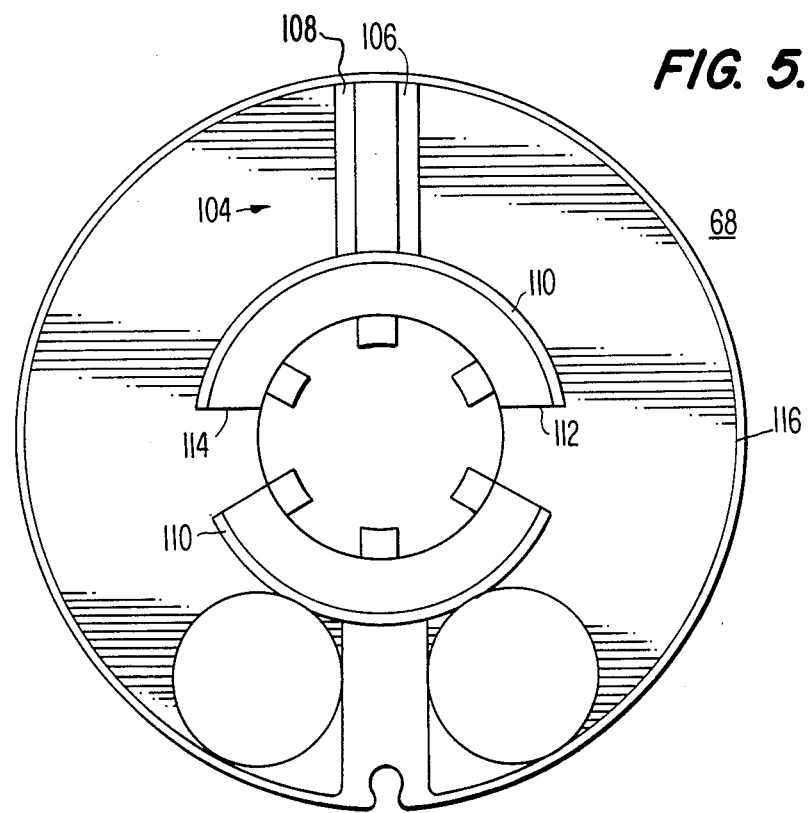
FIG. 5 is a top, plan view of one of the tape reels shown in FIG. 4.
Figure 6:
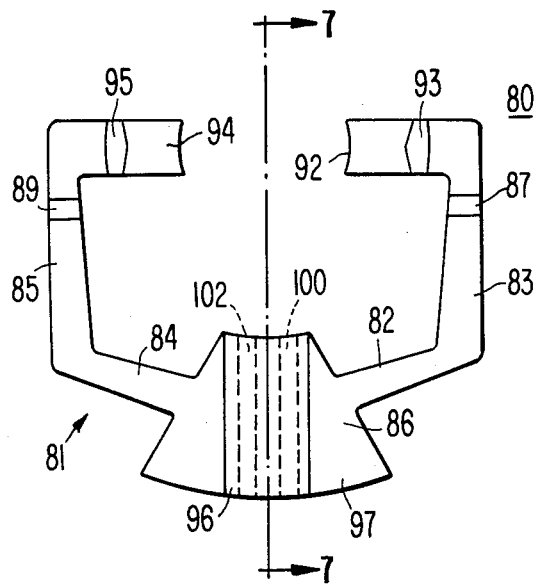
FIG. 6 is a top, plan view of one of the locking members shown in FIG. 4.
Figure 7:
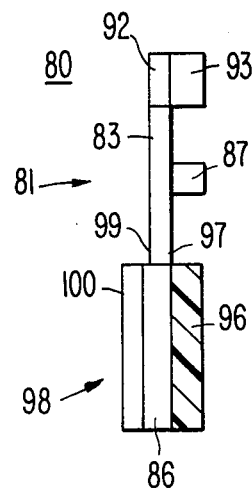
FIG. 7 is a side, cross-sectional view of the locking member shown in FIG. 6 taken along line 7—7.
Figure 8:
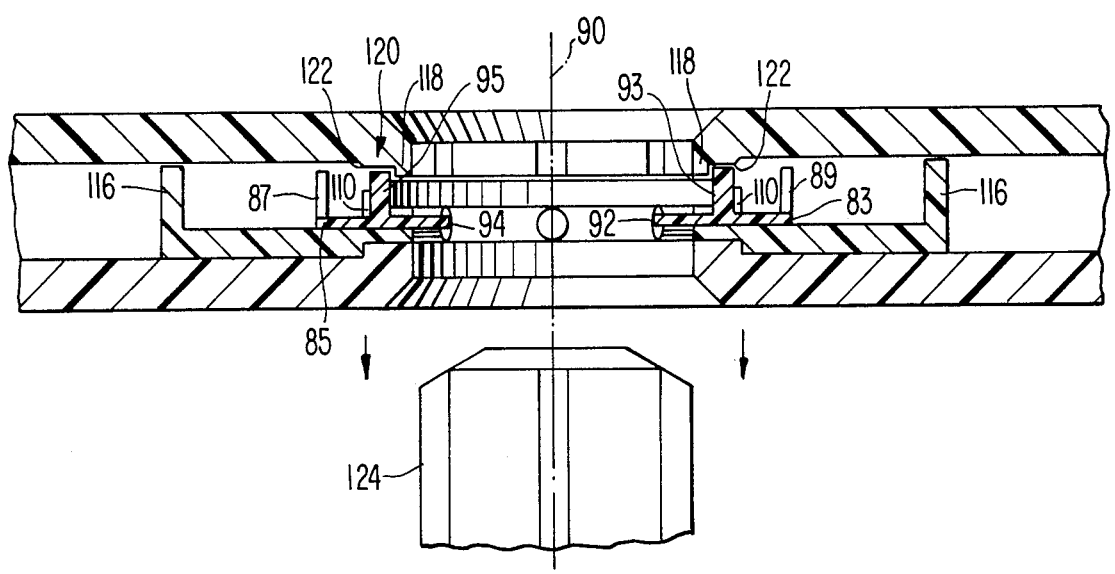
FIG. 8 is a front, cross-sectional view of the self-locking hub assembly shown in FIG. 4 taken along line 8—8.

FIGS. 4–8 also illustrate the method of assembly according to the present invention. This method comprises the following steps. First, the locking member 80 shown in FIGS. 6 and 7 is formed to include: the at least one movable portion, for example, the engaging portions 93, 95 and the abutting portions 92, 94; spring means 81; and locating means 98 as described above. Second, the locking member 80 is picked up by an automated apparatus (not shown), such as a robot arm. Third, the locking member 80 is advanced to a tape reel hub 68 formed to include mounting means 104 corresponding to the locating means 98, such as shown in FIG. 5. Fourth, the locking member 80 is inserted into the hub 68 such that the locating means 98 is fixedly received by the mounting means 104. Fifth, the hub 68 is mounted in a cassette base 66 as shown in FIGS. 4 and 8. Sixth, a cassette cover 64 is formed to include the receiving means 120. Seventh, and finally, the cassette cover 64 is positioned on the base 66 such that the receiving means 120 receives the engaging portions 93, 95, as shown again in FIGS. 4 and 8.

The second embodiment of the self-locking hub assembly according to the present invention is shown in FIGS. 9–18. This self-locking hub assembly is generally indicated by reference numeral 160 and includes a locking member 162 which, in its entirety, can slide radially inward with respect to the plane of a tape reel hub 171 and 172 (not shown) as indicated by arrow "B" in FIG. 9, or radially outward as indicated by arrow "C" in FIG. 10 via a spring means 168 discussed below. In this second embodiment, the locking member 162 again includes operatively connected abutting portions 173 and engaging portions 176. However, the second embodiment of the self-locking hub assembly 160 can take several forms, as follows.

Figure 9:
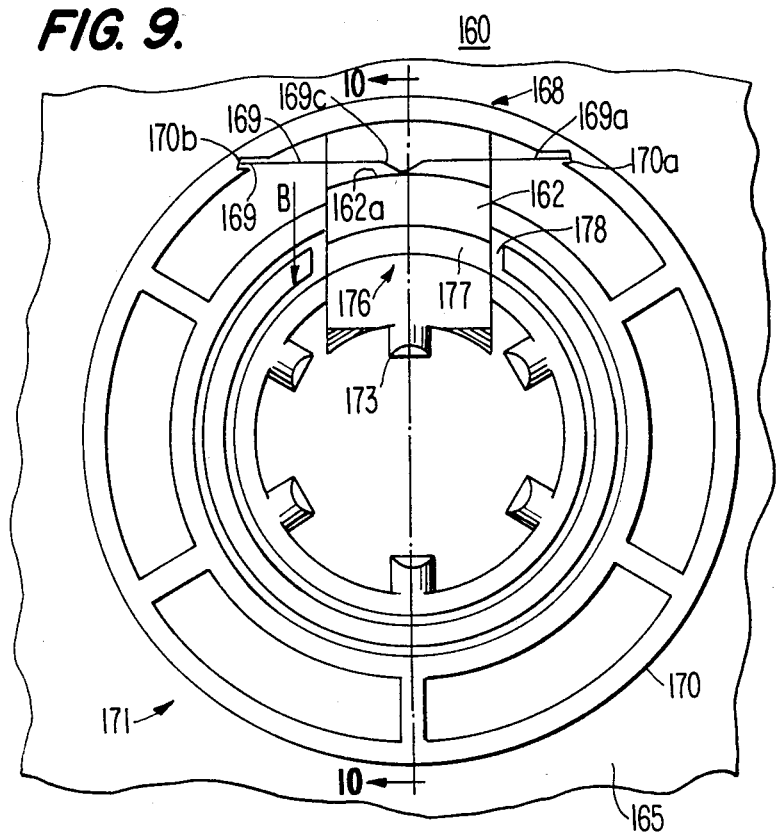
FIG. 9 is a top, cut away view of a second embodiment of the self-locking hub assembly for a compact, audio, tape cassette according to the present invention, illustrating particularly the tape cassette disengaged from a tape player/recorder.
Figure 10:
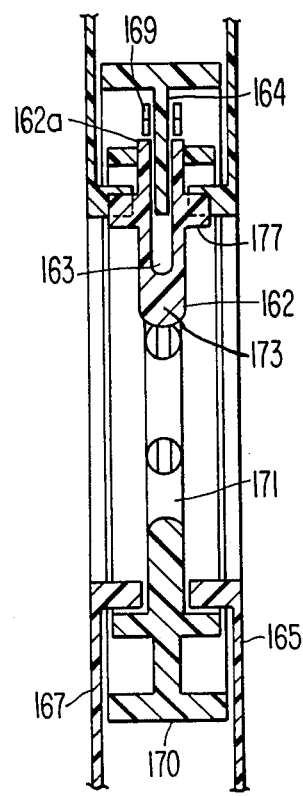
FIG. 10 is a side, cross-sectional view of the self-locking hub assembly for the compact, audio, tape cassette shown in FIG. 9 taken along line 10—10.
Figure 11:
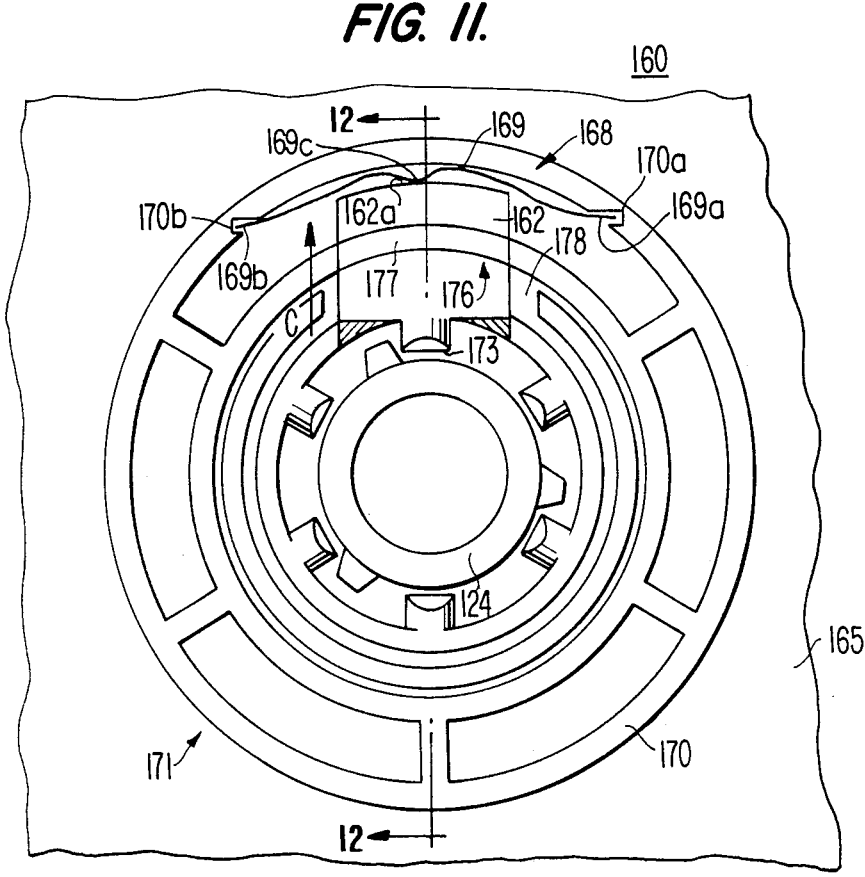
FIG. 11 is a top, cut away view of a second embodiment of self-locking hub assembly for a compact, audio, tape cassette according to the present invention, illustrating particularly the tape cassette engaged with a tape player/recorder.
Figure 12:
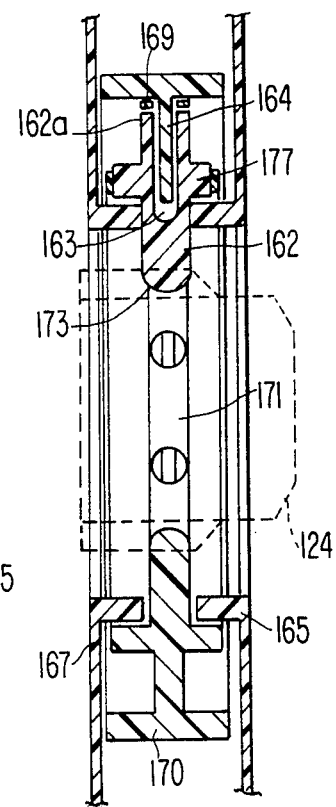
FIG. 12 is a side, cross-sectional view of the self-locking hub assembly for the compact, audio, tape cassette shown in FIG. 11 taken along line 12—12.
Figure 17:
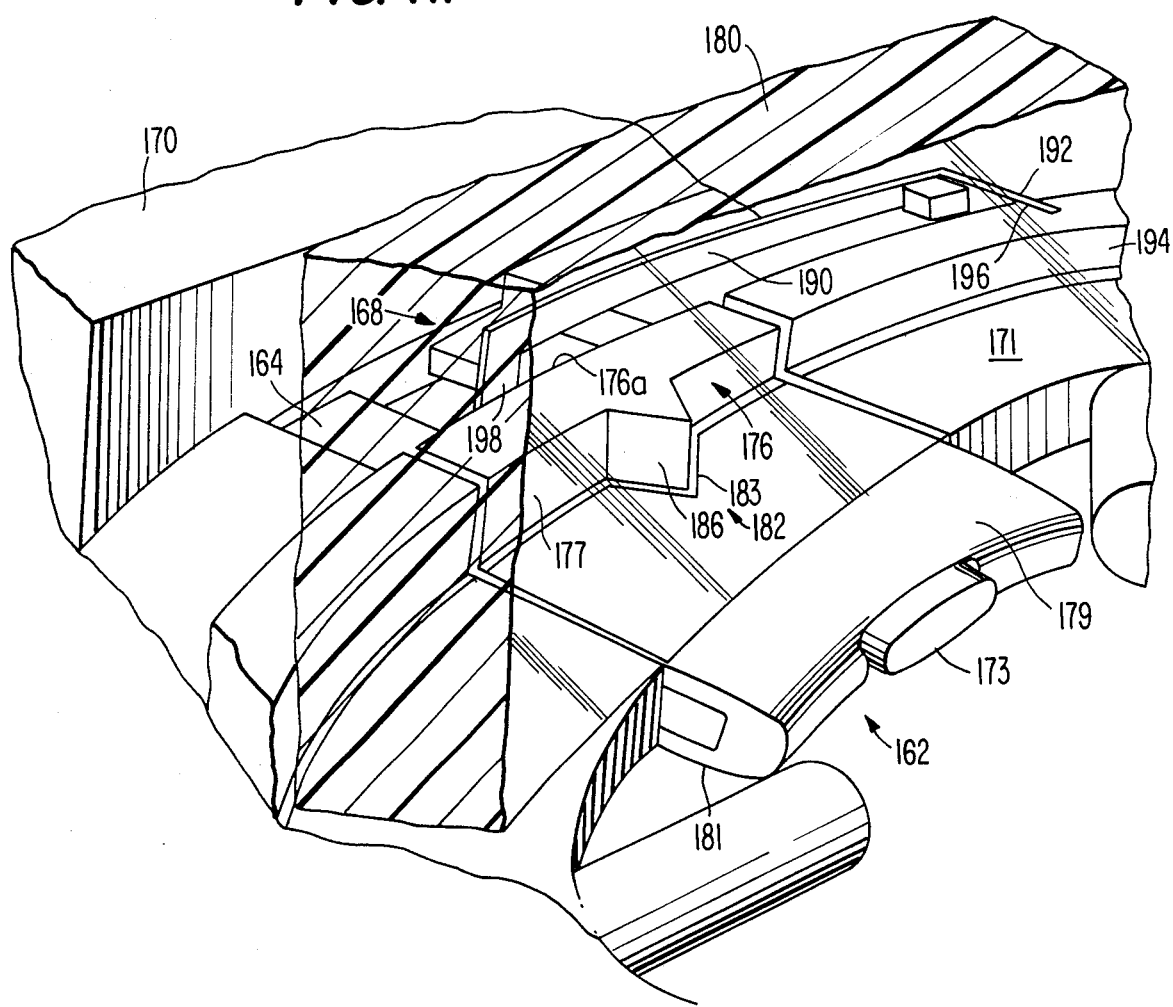
FIG. 17 is a perspective view of the second embodiment of the self-locking hub assembly according to the present invention received by the hub.

In a first form shown in FIGS. 9–12 and 17, the locking member 162 includes an opening 163 which receives in sliding relation a planar hub extension 164 (see FIGS. 10, 12 and 17). The engaging portion 176 includes ribs 177 formed transversely across the elongated top 179 and bottom 181 of the locking member 162. In the alternative, the engaging portion 176 could be only one rib 177 formed on the top 179 of the locking member 162, or only one rib 177 formed only on the bottom 181 of the locking member 162. The raised annular ring 180 of the cover 165 of the tape cassette 161 includes receiving means 182, such as a slot 178 corresponding substantially in width to the locking member 162.

The ribs 177 can also include or be substituted with one or more projections 186 such as the teeth shown in FIG. 17. Accordingly, the raised annular ring 180 formed on the inside surface of the cover 165 would include a receiving means 182 in the form of a set of corresponding indentations 183.

The spring means 168, as with the first embodiment described above, is positioned between the hub 171 and the locking member 162 to normally bias the locking member 162 radially inward in a plane parallel to the hub 171, as shown by arrow "B" of in FIG. 9. The spring means 168 can be one or two leaf springs 169 whose ends 169a and 169b are received by recesses 170a and 170b respectively, formed in the outer wall 170 of the hub 171. Alternatively, the ends 169a and 169b can be retained by retaining posts (not shown) formed on the hub 171. The middle 169c of each leaf spring 169 contacts in biasing relation the rear 162a of the locking member 162.

The spring means 168 can be any of several types as long as it is capable of normally biasing the locking member 162 radially inward. For example, the spring means 168 could be a coil spring received by the locking member 162 or a leaf spring integrally formed of the locking member 162 as described below. Further, the spring means 168 does not have to be oriented only as shown in FIGS. 9-12. For example, as shown in FIG. 17, a leaf spring 190 can be connected at a first end 192 to the inner annular wall 194 of the hub 171 by a recess 196. The second, free end 198 of the leaf spring 190 can abut the rear 176a of the engaging portion 176. Also the spring means 168 can be any resilient material such as rubber or soft foam.

FIGS. 13-16 and 18 illustrate different forms of the second embodiment of the locking member 162 according to the present invention.

Figure 13:
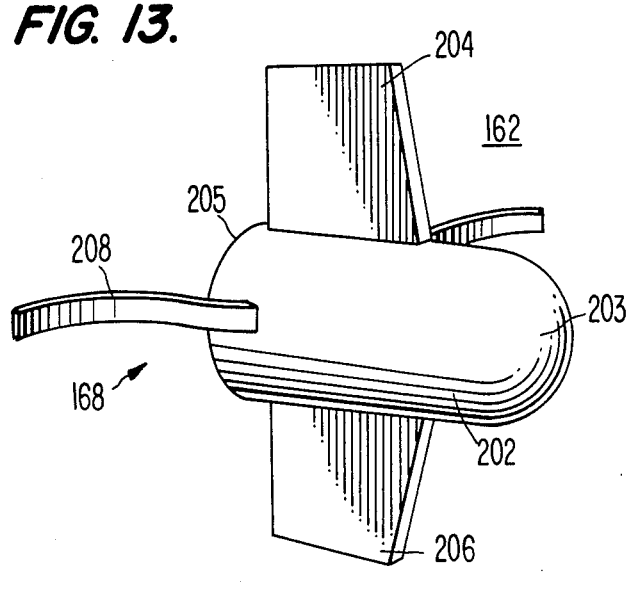
FIG. 13 is a perspective view of another form of the locking member according to the second embodiment of the present invention.

In FIG. 13, the locking member 162 is a solid, plastic cylinder 202 with a rounded front abutting portion 203, a flat rear 205, and opposing fins 204, 206 serving as the engaging portions 176. The spring means 168 in this form is a plastic leaf spring 208 formed integrally of the rear 205 of the cylinder 202.

Figure 14:
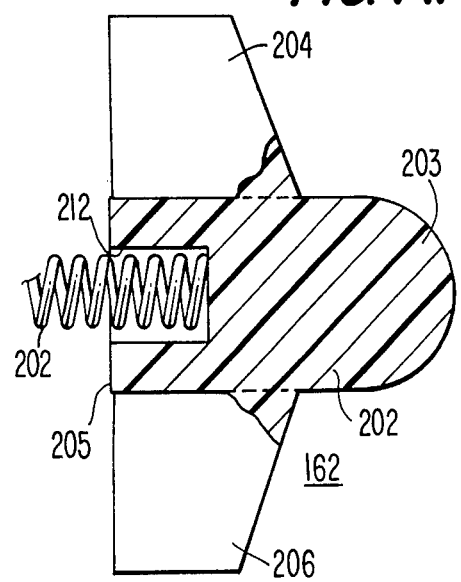
FIG. 14 is a side, cross-sectional view of a further form of the locking member according to the second embodiment of the present invention.

In FIG. 14, the cylinder 202 receives a separate, coil spring 210 in a recess 212 formed at the rear 205 of the cylinder 202.

Figure 15:
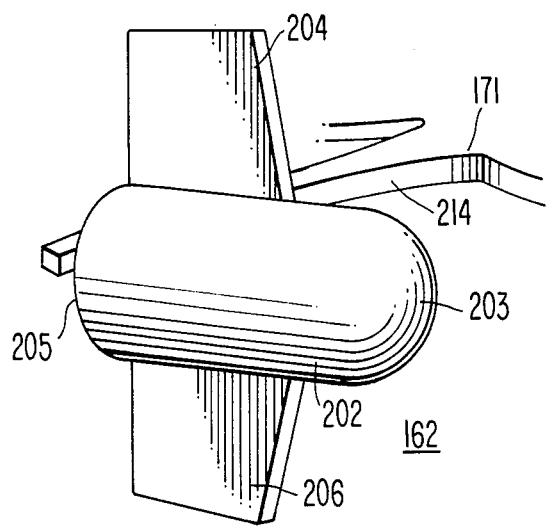
FIG. 15 is a perspective view of still another form of the locking member according to the second embodiment of the present invention.

In FIG. 15, the cylinder 202 is biased inwardly by a plastic leaf spring 214 which is formed integrally on the hub 171 to contact the rear 205 of the cylinder 202.

Figure 16:
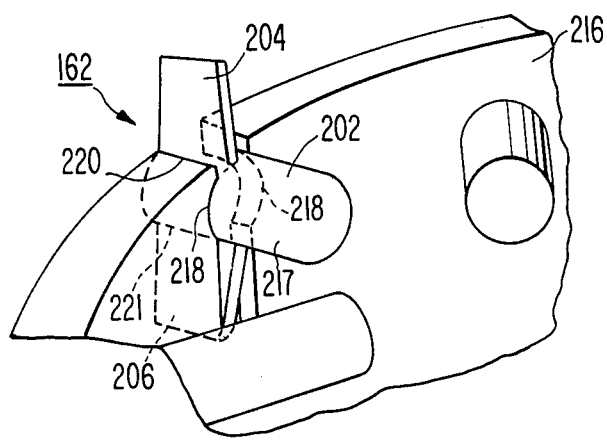
FIG. 16 is a perspective view of one of the alternate forms of the locking member shown in FIGS. 13-15 received by the hub.

FIG. 16 is a perspective view illustrating orientation of one of the locking members 162 shown in FIGS. 13-15 within an inner annular wall 216 of the hub 171. As can be seen, the rounded sides 217 of the cylinder 202 are received by corresponding, opposing, convex walls 218 formed in the inner, annular wall 216 of the hub 171. The walls 218 are separated by top and bottom openings 220, 221 for receiving the fins 204, 206, respectively. This structure allows easy inward and outward movement of the locking member 162 relative to the hub 171.

Figure 18:
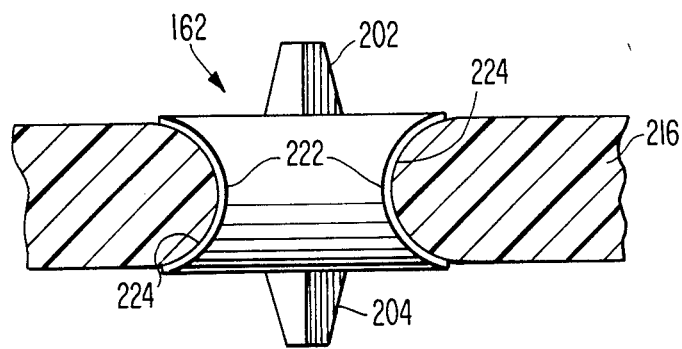
FIG. 18 is a front view of still another form of the locking member according to the second embodiment of the present invention received by the hub.

In FIG. 18, the locking member 162 is a solid, relatively flat member with rounded, indented sides 222 and again opposing fins 202 and 204. The locking member 162 is inserted into the inner annular wall 216 of the hub 171 via corresponding concave walls 224.

In contrast to the "non-solid" locking member 80 shown in FIGS. 9-12 and 17, the "solid" locking 162 member shown in FIGS. 13-16 and 18 decreases contact area with the hub 171, which in turn decreases the force needed to displace the locking member outwardly. A solid locking member 162 is also easier to mold than a non-solid locking member 80.

Operation of the second embodiment of the present invention will now be described, again with reference to FIGS. 9-18. Normally, the locking member 162 is kept in the "locked" position as shown in FIGS. 9 and 10. That is, the spring means 168 normally biases the locking member 162 with the operatively connected abutting portion 173 and engaging portion 176 formed thereon inwardly parallel to the plane of the hub 171. As a result, the engaging portion 176 is received by the receiving means 182, the hub 171 is prevented from rotating and no "despooling" of the tape occurs. On the other hand, as shown in FIGS. 11 and 12, upon insertion of the tape cassette 161 into a tape player/recorder, the finned spindle 124 thereof abuts and pushes on the abutting portion 173, which causes the locking member 162 with the engaging portion 176 formed thereon to move radially outward. As a result, the engaging portion 176 leaves the receiving means 182 formed in the raised, annular ring 180 of the tape cassette cover 165, thereby releasing the hub 171 from the "locked" position and creating the "unlocked" position. In the unlocked position, the hub 171 is free to rotate on the raised annular rings 180 and transport tape while being driven by the spindle 124 of the tape player/recorder.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims.

What is claimed is:

1. A self-locking hub assembly for use in a compact, audio, tape cassette having at least one hub to be rotated by a spindle of a tape player/recorder, the tape cassette also including opposing, substantially planar cover and base, each having a raised annular ring for locating the at least one substantially planar hub of the tape cassette, comprising:

(a) a unitary, locking member positioned on a surface of the hub with first and second portions movable in a plane parallel to the plane of the hub;

(b) receiving means formed on the raised annular ring;

(c) spring means associated with the locking member to normally bias the first and second movable portions radially inward parallel to the plane of the hub, there by engaging the first and second movable portions with the receiving means formed on the raised annular ring and preventing rotation of the hub;

wherein the spring means comprises first and second spring arms extending from a central portion of the locking member to the first and second movable portions respectively, wherein each movable portion is formed at the end of each spring arm opposite the end extending from the central portion of the locking member, and wherein, when the tape cassette is inserted in either direction into the tape player/recorder, the spindle of the tape player/recorder enters the hub, abuts and moves each movable portion radially outward parallel to the plane of the hub, thereby removing each movable portion from engagement with the receiving means and allowing the hub to be rotated by the spindle.

2. The assembly as recited in claim 1, wherein the hub comprises mounting means, and the locking member comprises locating means which is received by the mounting means.

3. The assembly as recited in claim 2, wherein the locating means comprises a pair of parallel, rectangular projections and the mounting means comprises a corresponding pair of parallel, rectangular openings.

4. The assembly as recited in claim 3, wherein each movable portion comprises a projection formed on the locking member and the receiving means comprises at least one receptacle formed in the raised annular ring.

5. A compact, audio, tape cassette for use in a tape player/recorder, comprising:
 (a) a substantially planar cover;
 (b) a substantially planar base, the base fitting on the cover with the substantially planar portions parallel to define an enclosed space;
 (c) at least one raised annular ring formed on the cassette including receiving means formed therein;
 (d) at least one substantially planar tape reel hub located in the enclosed space by the at least one raised annular ring, the hub including a central opening for receiving a spindle of the tape player/recorder;
 (e) a unitary locking member positioned on a surface of the hub with first and second portions movable in a plane parallel to the plane of the hub; and
 (f) spring means associated with the locking member for normally biasing the first and second movable portions radially inward, thereby engaging the first and second movable portions with the receiving means and preventing rotation of the hub, wherein the spring means includes first and second spring arms extending from a central portion of the locking member, and wherein the first and second movable portions are formed at the end of each spring arm, respectively, opposite the end extending from the central portion of the locking member, and wherein, when the tape cassette is inserted in either direction into the tape player/recorder, the spindle enters the hub central opening, abuts and moves the first and second movable portions radially outward parallel to the plane of the hub, thereby removing the first and second movable portions from the receiving means and allowing the hub to be rotated by the spindle.

6. The cassette as recited in claim 5, wherein the hub comprises mounting means and the locking member further comprises a locating means which is received by the mounting means formed on the hub.

7. The cassette as recited in claim 6, wherein the locating means comprises a pair of parallel, rectangular projections and the mounting means comprises a corresponding pair of parallel, rectangular openings 8. A method for assembling a self-locking hub assembly for a compact, audio, tape cassette, comprising the steps of:
 (a) forming a unitary locking member having first and second movable portions spring means and locating means, wherein the spring means includes first and second spring arms extending from a central portion of the locking member, and wherein each movable portion is formed at the end of each spring arm respectively opposite the end extending from the central portion of the locking member;
 (b) forming a hub with a central opening and mounting means on an exterior surface thereof corresponding to the locating means;
 (c) picking up the locking member;
 (d) advancing the locking member to a tape reel hub;
 (e) locating the locking member on the exterior surface of the tape reel hub such that the locating means is fixedly received by the mounting means and the first and second movable portions extend into the central opening in the hub;
 (f) mounting the tape reel hub into a cassette base;
 (g) forming the cassette cover to include receiving means; and
 (h) positioning the cassette cover on the base such that the receiving means receives the at least one movable portion.

* * * * *